(12) United States Patent
Cretier et al.

(10) Patent No.: US 12,466,245 B2
(45) Date of Patent: Nov. 11, 2025

(54) MOTOR VEHICLE TAILGATE WITH SIMPLIFIED ASSEMBLY OF A SUPPORTING PLATE OF EQUIPMENT

(71) Applicant: OPmobility SE, Lyons (FR)

(72) Inventors: Romain Cretier, Sainte-Julie (FR); Emilien Hummer, Sainte-Julie (FR)

(73) Assignee: OPmobility SE, Lyons (FR)

( * ) Notice: Subject to any disclaimer, the term of this patent is extended or adjusted under 35 U.S.C. 154(b) by 0 days.

(21) Appl. No.: 18/258,988

(22) PCT Filed: Dec. 20, 2021

(86) PCT No.: PCT/EP2021/086804
§ 371 (c)(1),
(2) Date: Jun. 23, 2023

(87) PCT Pub. No.: WO2022/136279
PCT Pub. Date: Jun. 30, 2022

(65) Prior Publication Data
US 2024/0227520 A1     Jul. 11, 2024

(30) Foreign Application Priority Data
Dec. 23, 2020   (FR) ..................................... 2014063

(51) Int. Cl.
*B60J 5/10*     (2006.01)
*B60J 5/04*     (2006.01)
*B60R 16/02*    (2006.01)

(52) U.S. Cl.
CPC ............. *B60J 5/107* (2013.01); *B60J 5/0413* (2013.01); *B60J 5/0463* (2013.01); *B60J 5/0469* (2013.01); *B60R 16/02* (2013.01)

(58) Field of Classification Search
CPC ........ B60J 5/107; B60J 5/0413; B60J 5/0463; B60J 5/0469; B60J 5/0416; B60J 5/0468; B60J 5/0418
See application file for complete search history.

(56) References Cited

U.S. PATENT DOCUMENTS 5,822,927 A * 10/1998 Hellenkamp .......... B60J 5/0413
                                                  49/502
6,035,601 A *  3/2000 Yamaguchi .......... B60R 13/0206
                                                  52/784.16
(Continued)

FOREIGN PATENT DOCUMENTS

EP      1218209 A1    7/2002
FR      2776965 A1   10/1999
(Continued)

OTHER PUBLICATIONS

International Search Report for PCT/EP2021/086804, dated Apr. 4, 2022. International bureau of WIPO.
(Continued)

*Primary Examiner* — Marcus Menezes
(74) *Attorney, Agent, or Firm* — M&B IP Analysts, LLC (57) ABSTRACT

The present disclosure relates to a motor vehicle opening panel, including: an inner panel having a lower portion, in which a second opening is formed, and an outer skin attached to the inner panel, comprising an inner surface located opposite an outer surface of the inner panel, characterized in that it further comprises, a supporting plate of equipment assembled on the inner panel and covered by the outer skin, the supporting plate being accessible through the second opening, and guide means capable of allowing blind assembly through the second opening of the supporting plate between the outer surface of the inner panel and the inner surface of the outer skin.

18 Claims, 8 Drawing Sheets

(56) References Cited

U.S. PATENT DOCUMENTS

| | | | |
|---|---|---|---|
| 6,354,653 B1 * | 3/2002 | Seeberger | B60J 5/0416 296/146.7 |
| 6,381,906 B1 * | 5/2002 | Pacella | B60J 5/0416 296/146.7 |
| 6,754,991 B2 | 6/2004 | Tokui et al. | |
| 10,752,096 B2 * | 8/2020 | Sannohe | B60J 10/74 |
| 2005/0156450 A1 * | 7/2005 | Koa | B60J 5/0416 296/146.1 |

FOREIGN PATENT DOCUMENTS

| | | |
|---|---|---|
| FR | 2802238 B1 | 6/2001 |
| FR | 3010351 A1 | 3/2015 |

OTHER PUBLICATIONS

Notification pursuant to Article 94(4) EPC for application No. EP 21840928.2, dated Mar. 14, 2025. European Patent Office, Rijswijk, Netherlands.

* cited by examiner

MOTOR VEHICLE TAILGATE WITH SIMPLIFIED ASSEMBLY OF A SUPPORTING PLATE OF EQUIPMENT

The present disclosure relates to the field of motor vehicle bodywork parts, more specifically to opening panels, such as tailgates or side doors, and in particular to the integration of equipment items that are installed therein.

For example, a motor vehicle tailgate generally includes an outer panel (also called an outer skin) mounted on an inner panel (also called a liner).

The inner panel is provided with a first opening in the upper portion of the tailgate which is intended to accommodate a window. In the lower portion of the tailgate, this inner panel is generally provided with small cavities that allow local routing for the attachment of components.

On some vehicles, motor vehicle tailgates incorporate, in the lower portion of the tailgate, rear side signal lights, such as brake lights; generally a left light and a right light located symmetrically on either side of the tailgate. Preferably, these two lights are situated along and as close as possible to the lateral edges of the tailgate so that, when the tailgate is in the closed position, they match up with the complementary rear light situated on the vehicle body. Such lights are currently manufactured by suppliers in the form of light units or optical units. Such optical units include a rear portion, or housing, in which the lighting device is arranged, and a window, also called a lens, that allows light through when the light is in operation. These two side lights are fitted to and mounted on the tailgate on and via its outer face, which presents a number of drawbacks.

Firstly, it is necessary to provide a protective glass that is sealed relative to the optical housing in order to protect the lighting device. In addition, an operator has to mount the two side lights at two separate locations on the tailgate, connect wiring harnesses thereto, and seal the mounting to prevent runoff water from penetrating into the volume delimited by the inner panel and the outer skin of the tailgate by passing between the light and the outer skin, which presents practical difficulties.

Another drawback lies in the fact that side lights mounted in this way look like they have been added on and do not appear seamless with the rest of the tailgate, which negatively affects its esthetic appearance. Indeed, a trend with automobile manufacturers is to ensure that the various outer surfaces of the vehicle are flush with one another and appear seamless. In some configurations, light elements can even remain partially or completely invisible from the outside, for example when they are not active ("hidden until lit"). This can also be the case with radar situated behind an opaque wall.

Furthermore, in addition to the matter of the side lights, another trend with automobile manufacturers is to incorporate a lighting signature at the rear of vehicles, for example continuous lighting between the side portions of the tailgate. In general, such a lighting device is also mounted via the exterior of the tailgate and can present problems with regard to sealing or not being flush with the rest of the tailgate.

Finally, tailgates can incorporate driver-assistance components (such as radars, lidars, or cameras) or communication components (such as antennas or screens). All of these components have to be incorporated into the tailgate in such a way that, once again, they are sealed and flush (by means of a radome for example) with the rest of the tailgate.

It is thus desirable to be able to arrange such equipment as close as possible to the outer skin, preferably between the inner panel and the outer skin.

At the present time, document FR 3010351 discloses a motor vehicle tailgate including a technical panel (bearing a set of technical elements) that is attached to the lower portion of the inner panel, the inner panel and the technical panel being covered by a tailgate outer skin, which is joined to the former two by gluing.

However, such a solution is not satisfactory because it entails the inner panel and the outer skin being glued to one another only after the technical panel has been attached, which considerably complicates the assembly of the opening panel. There is therefore a need to conceive of a technical solution in which such a supporting panel can be assembled within the space delimited by the inner panel and the outer skin after the latter two have been glued to one another.

One envisaged solution was to assemble the inner panel and the outer skin beforehand and then integrate the supporting element and its equipment from the rear, i.e. on the passenger compartment side (the side opposite the outer skin) through a mounting opening situated in the lower portion of the inner panel.

An additional drawback is that the equipment described above that it is desired to position as close as possible to the outer skin, along the entire length of the opening panel and up to the two side ends thereof, entails the presence of a large supporting element. Consequently, it is very difficult to mount such a supporting element in the exact position via the mounting opening. This greatly complicates the step of assembling the supporting element and the correct positioning of the equipment that it bears.

The object of the present disclosure is in particular to overcome this drawback by providing a motor vehicle opening panel architecture that makes it possible to easily mount an equipment supporting plate between a lower portion of the inner panel and the outer skin of the opening panel from the passenger compartment of the vehicle.

To that end, the present disclosure relates to a motor vehicle opening panel including:
- an inner panel, preferably made of plastic material, provided with an upper portion in which a first opening intended to accommodate a window is formed and a lower portion in which a second opening is formed; and
- an outer skin, at least partially made of plastic material, mounted on the inner panel, and including an inner surface facing an outer surface of the inner panel. The opening panel according to the present disclosure further includes:
- a supporting plate for supporting equipment that is joined to the inner panel and covered by the outer skin, the supporting plate being accessible through the second opening, and
- guide means capable of allowing blind assembly, through the second opening, of the supporting plate between the outer surface of the inner panel and the inner surface of the outer skin.

By virtue of the inner panel being provided with guide means that allow blind assembly, that is assembly in a region that is not accessible to the operator, through the opening for the supporting plate, it is not necessary for the operator to have any particular experience or dexterity in order to insert the supporting plate between the outer skin and the inner panel. Such a solution also reduces the risk of a mounting error. Furthermore, this solution allows removable assembly of the plate on the inner panel, which affords the option of disassembling the supporting plate without disassembling the inner panel and the outer skin. This greatly facilitates maintenance of the supporting plate and of equipment items that it bears.

Advantageously, the guide means allow the supporting plate to be mounted between the outer surface of the inner panel and the inner surface of the outer skin such that a side end of the supporting plate is adjacent to a side wall of the opening panel.

It is thus possible to ensure that certain items of equipment borne by the supporting plate, such as lighting devices (lamps), can reach the side edges of the opening panel, in particular to make the break in the lighting between the portion of a rear light borne by a tailgate and the portion of the rear light borne by the vehicle body as seamless as possible.

Preferably, the guide means are configured such that the supporting plate is guided between, on the one hand, an initial position of insertion of the supporting plate in which the supporting plate extends in a direction that is not parallel, and preferably substantially perpendicular, to the general plane formed by the second opening and, on the other hand, a final assembled position of the supporting plate in which the supporting plate extends in a direction that is substantially parallel to said general plane formed by the second opening.

Advantageously, at least a portion of the guide means is formed as one piece with the inner panel, for example molded as one piece therewith, and is configured to accommodate a mounting arm of the supporting plate.

In order to simplify the manufacture of the opening panel, the guide means include at least two ribs each forming a guide groove, the guide means further including at least two lugs, which are preferably connected by a cylindrical rod and are formed as one piece with the mounting arm of the supporting plate, for example molded as one piece therewith, and forming a pivot member that has an axis of rotation about which the mounting arm of the supporting plate can pivot until the mounting arm reaches the assembled position.

This configuration is particularly suited to the case in which it is necessary to insert a side end of the supporting plate into a region that is difficult to access, for example at the side edge of the tailgate, which it greatly facilitates. Specifically, an operator just has to insert the supporting plate through the second opening in such a way that the mounting arm of the plate is inserted into the guide grooves formed by the ribs, and pivot the supporting plate about the axis of rotation of the pivot member formed by the lugs in order to move the plate into the desired assembled position, such as a position in which an item of lighting equipment borne by the side end of the supporting plate is located at the side edge of the inner panel and the side wall of the vehicle, as close as possible to the outer skin. In order to facilitate the insertion and guidance of the mounting arm of the plate within the guide grooves, these grooves can be in the shape of a flared "U" which facilitates first the entry of the lugs and then guides them within their narrowing cross section up to the end of the guide grooves where the mounting arm reaches the desired position in order to pivot the supporting plate.

According to an embodiment, the supporting plate includes a main body from which projects the mounting arm with which the lugs are formed as one piece, said lugs being configured so as to be inserted into the guide grooves and pivot about the axis of rotation when the mounting arm reaches the end of travel within the guide grooves.

Because the mounting arm projects relative to the main body of the supporting plate, it is possible to create an offset by virtue of the offset axis of rotation which makes mounting more reliable given that the main body of the plate includes fragile electronic equipment and/or lighting surfaces. Thus, during the initial insertion and then when pivoting about the axis of rotation, the more fragile portions of the plate are brought into position while remaining away from the other parts of the opening member until reaching the assembled position.

Preferably, in order to further facilitate mounting thereof, the supporting plate is made in multiple parts joined to one another.

In order to conceal the supporting plate from the passenger compartment of the vehicle, the opening panel further includes a trim element attached to an internal surface of the inner panel and covering the second opening.

In order to be able to access the supporting plate and the equipment borne thereby and its connections, in particular for maintenance operations, the trim element is, for example, attached to the lower portion of the inner panel in a removable manner, for example by riveting, screwing or snap-fitting.

Advantageously, the supporting plate includes an electromagnetic radiation emitting and/or receiving device and the outer skin includes, facing the electromagnetic radiation emitting and/or receiving device, at least one transmission zone, made of plastic material, which is at least partially transparent to said electromagnetic radiation.

By virtue of the supporting plate which can bear other equipment bearing the electromagnetic radiation emitting and/or receiving device, it is possible for the connections for said device and for this other equipment to be brought together. In addition, the integration of the electromagnetic radiation emitting and/or receiving device is greatly simplified, and the esthetics of the vehicle are also improved since the device is no longer attached to the opening panel via the exterior. It is also not necessary to provide any seal (for example around the light units of a lighting device) since the device can be placed directly in the dry zone of the opening panel delimited between the outer surface of the inner panel and the inner surface of the outer skin. In addition, such a solution makes it possible to do away with the need to provide a specific glass tailored to the shape of the device since the transmission zone plays this role. It is also possible to ensure that the device (or a portion thereof) is concealed, for example by the partial opacity of the outer skin. In the case of a lighting device, this device can be made invisible to an observer outside the vehicle when it is not turned on.

Alternatively, and to simplify the manufacture of the outer skin, the transmission zone corresponds to the entire outer surface of the outer skin. In addition to this making it possible to simplify the manufacture of the outer skin, a uniform finish is thus obtained which can be considered more esthetically pleasing, and it is also possible to place other elements behind the outer skin so as to make them visible, such as a logo, which does not have to be added to the outer skin as protruding extra thickness.

Advantageously, the opening panel includes a tailgate or a side door.

BRIEF DESCRIPTION OF THE FIGURES

The present disclosure will be better understood from reading the following description in which the opening panel of the various disclosed embodiments is described as a tailgate, this description being given solely by way of example and with reference to the appended drawings.

FIG. 2 is a set of views (FIGS. 2A and 2B) showing a front view and a rear view of an equipment supporting plate according to an embodiment.

FIG. 3 is a set of views (FIGS. 3A and 3B) showing a portion of the plate shown in FIGS. 2A and 2B, according to an embodiment.

FIG. 6 is a set of views (FIGS. 6A and 6B) showing enlargements of the zone defined in FIG. 5, according to an embodiment.

DETAILED DESCRIPTION

FIGS. 1 to 8 show a motor vehicle tailgate 1 and the various constituent elements thereof according to one embodiment of the various disclosed embodiments.

Reference is now made to all of the figures which illustrate, individually or in combination, one embodiment of a motor vehicle tailgate 1 according to the various disclosed embodiments. The tailgate 1 includes:

an inner panel 2, preferably made of plastic material, provided with an upper portion 2A in which a first opening 21 intended to accommodate a window is formed and a lower portion 2B in which a second opening 22 is formed; and an outer skin 3, at least partially made of plastic material, mounted on the inner panel 2, and including an inner surface 31 facing an outer surface 23 of the inner panel 2.

The tailgate 1 further includes:

a supporting plate 4 for supporting equipment 6 that is joined to the inner panel 2 and covered by the outer skin 3, the supporting plate 4 being accessible through the second opening 22, and guide means (8, 9, 43a) capable of allowing blind assembly through the second opening 22 of the supporting plate 4 between the outer surface 23 of the inner panel 2 and the inner surface 31 of the outer skin 3.

Thus, when the supporting plate 4 is in its final assembled position (visible in FIGS. 1 and 8) within the dry zone 5 of the tailgate, the equipment that it bears is protected from the outside environment, in particular by virtue of the sealtight assembly (generally produced by bonding) between the inner panel 2 and the outer skin 3.

The area of the outer skin 3 situated facing the equipment borne by the supporting plate 4 is a transmission zone 32 made of plastic material that is at least partially transparent to the electromagnetic radiation from the equipment. What is meant by "at least partially transparent to the electromagnetic radiation" is that this transmission zone 32 allows a sufficient quantity of electromagnetic waves through for the item of equipment to be able to carry out its dedicated function correctly and continuously. In the case of a lighting device, for example, the transmission zone 32 allows the light rays emitted by the device through so that they can be seen by an observer outside the vehicle.

The equipment supporting plate 4 is a housing forming a hollow receptacle and the two side ends 42 thereof are intended to be accommodated in two correspondingly shaped housings 25 located at the periphery of the inner panel 2 when the supporting plate 4 is in its assembled position. This makes it possible, when lighting devices (for example rear lights) are mounted on the side ends of the supporting plate 4, to make a break in the lighting between two adjacent portions of a rear light borne by the plate 4 and a rear light borne by the body of the vehicle on which the tailgate 1 is mounted as seamless as possible. The plate 4 includes an attachment interface, the elements 51a to 51e of which (referenced in FIGS. 2A and 2B) allow attachment to the other parts of the tailgate, such as the inner panel 2, the outer skin 3 or the technical panel when this element is present within the tailgate. The supporting plate 4 is removably attached to the inner panel 2 via the attachment interface and more precisely via its elements 51b, 51c and 51e which are located in the upper portion of the plate 4 in order to be able to be removed in the event of maintenance on the plate 4 and/or on the equipment that it bears. The elements 51a and 51d allow removable attachment in the lower portion of the supporting plate 4 (attachments are not visible in the figures). For example, the elements 51a and 51d can receive elements of corresponding shape from the inner surface 31 of the outer skin 3, from the outer surface 23 of the inner panel 2, or from the technical panel 15. The removable attachments made in the bottom portion of the supporting plate help to stabilize the plate within the tailgate and thus make it possible to avoid play or inaccuracies in mounting that could cause malfunctions in the equipment or nuisance noise when driving the vehicle or when opening/closing the tailgate 1.

The supporting plate 4 includes three portions: a middle portion 41a and two side portions 41b and 41c which together form the main body of the supporting plate 4. It bears multiple items of equipment 61, 62, 63. Of course, the plate 4 can include just one item of equipment or multiple items of equipment and these can be different from one another (as is the case in the embodiment shown). For example, there can be one or more lighting devices that emit electromagnetic radiation in the visible spectrum. These lighting devices can be distributed across all or part of the width of the plate 4 in order to create the desired lighting signature. Thus, it is possible to obtain a lighting signature of seamless appearance across the entire width of the tailgate if desired. These items of equipment can also be driver-assistance devices such as, for example, radar (which generally emits electromagnetic radiation of between 20 and 80 GHZ), lidar (which generally emits electromagnetic radiation in the infrared spectrum) or rear-view cameras. Finally, it can also be communication equipment, such as screens or antennas. Generally, this equipment can be any device that needs transparency to radiation.

In the embodiment described with reference to the figures, the middle portion 4a includes an element forming an illuminated logo 61 and the lower area of the side portions 41b and 41c forms right and left signal lights 62. The upper area of the three portions 41a, 41b and 41c taken together forms a continuous lighting strip 63 across the tailgate 1 which thus produces a lighting signature. This upper portion can also house a large antenna.

Figure 1:
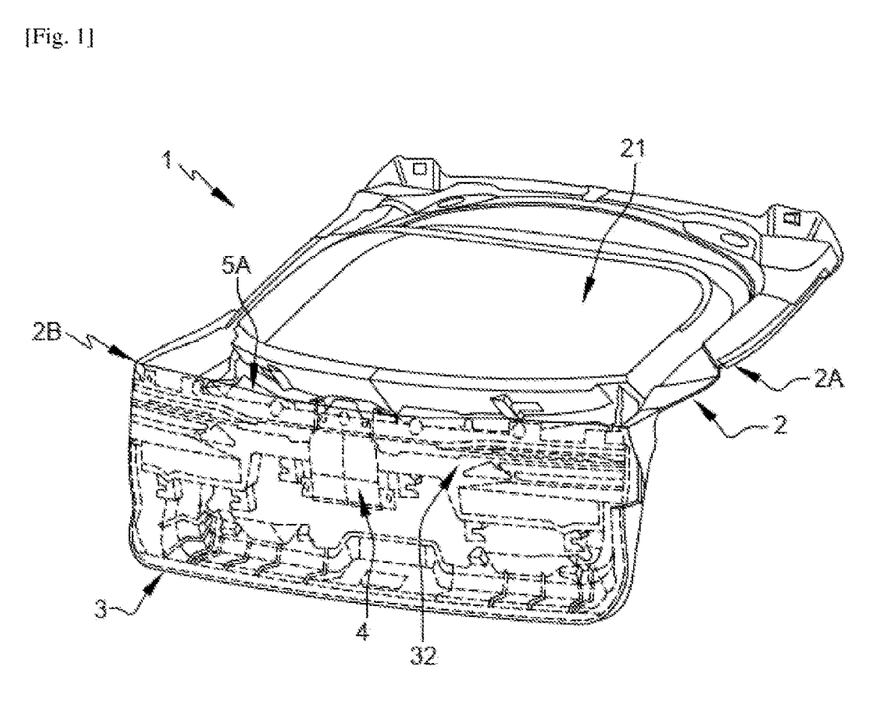
FIG. 1 is a perspective view from the rear of the vehicle of a tailgate according to one embodiment.
Figure 2A:
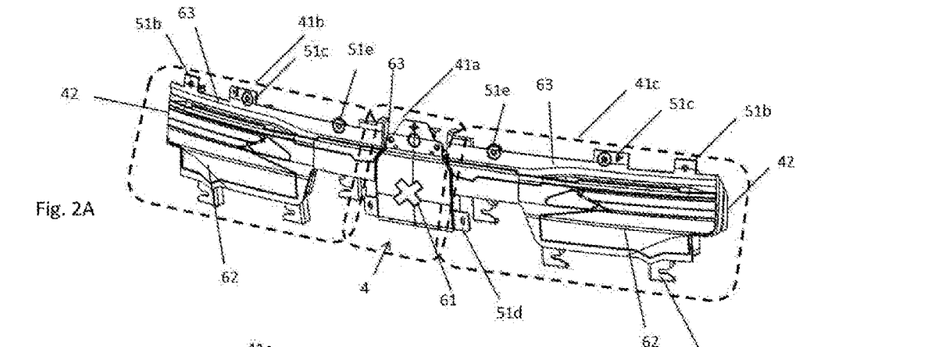
Figure 2B:
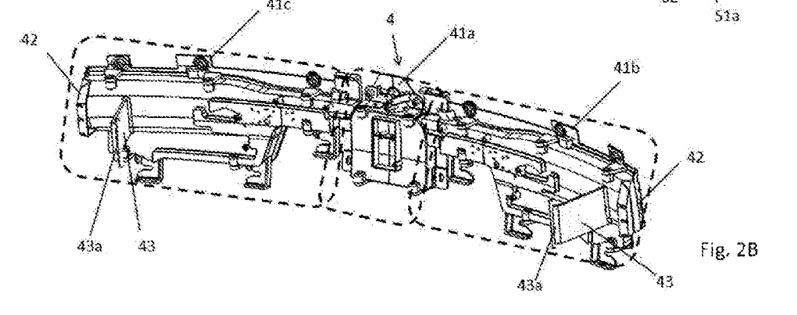
Figures 3A, 3B:
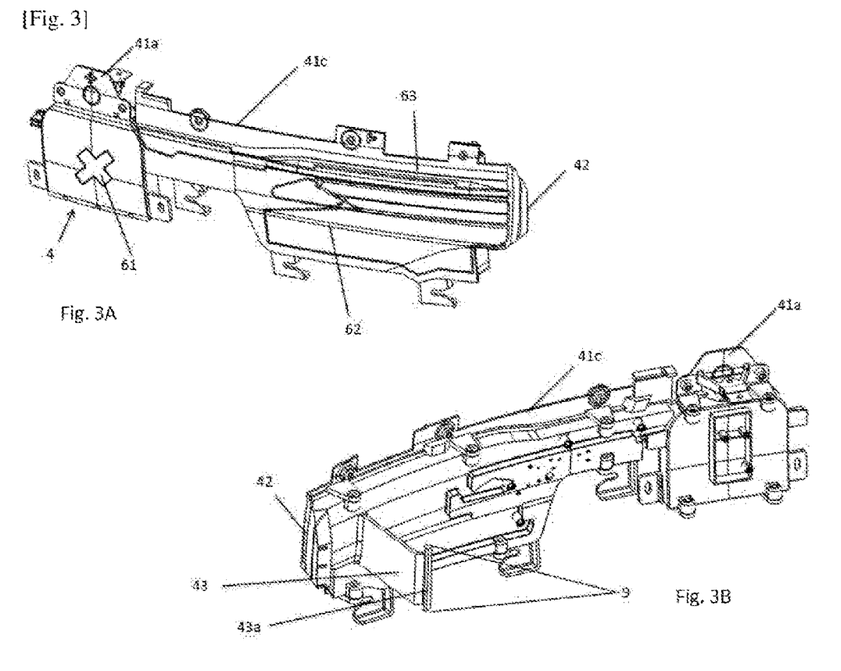
Figure 7:
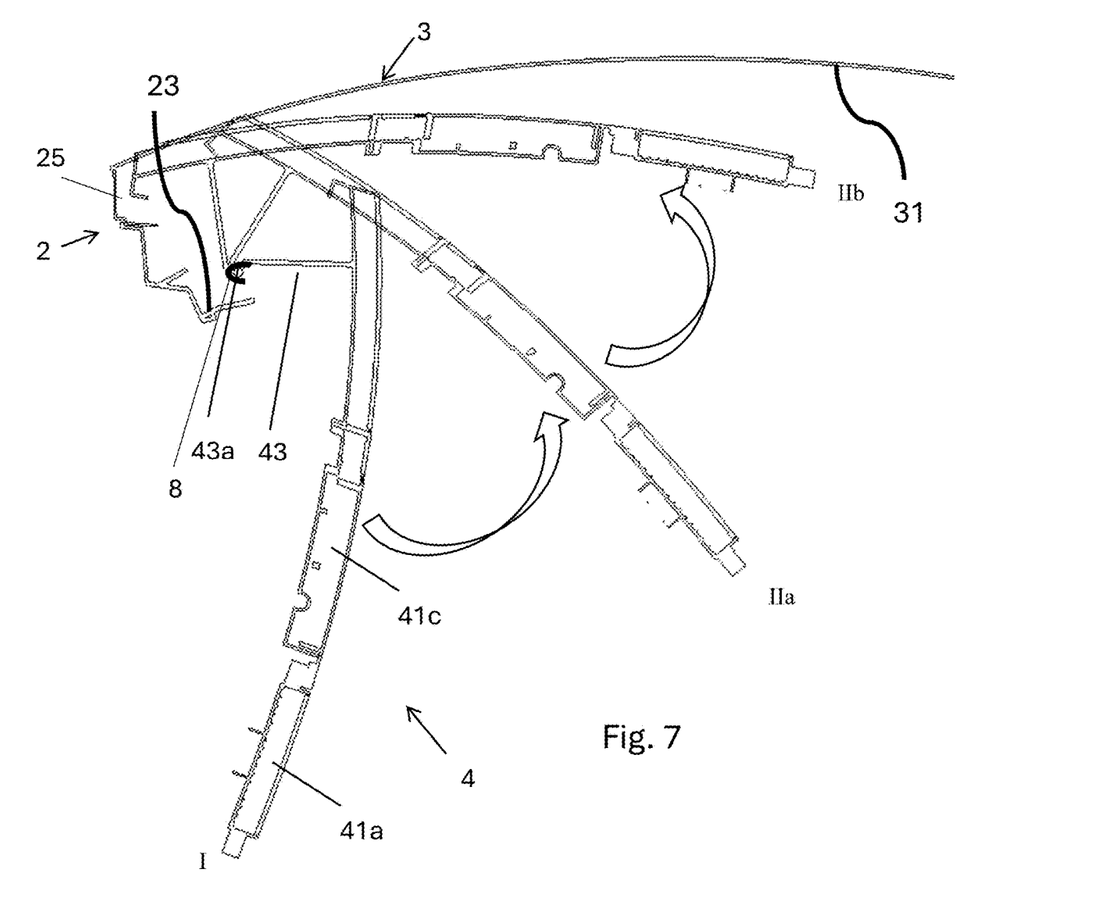
FIG. 7 is a schematic view showing different positions of the supporting plate during the mounting thereof within the tailgate, according to an embodiment.
Figure 8:
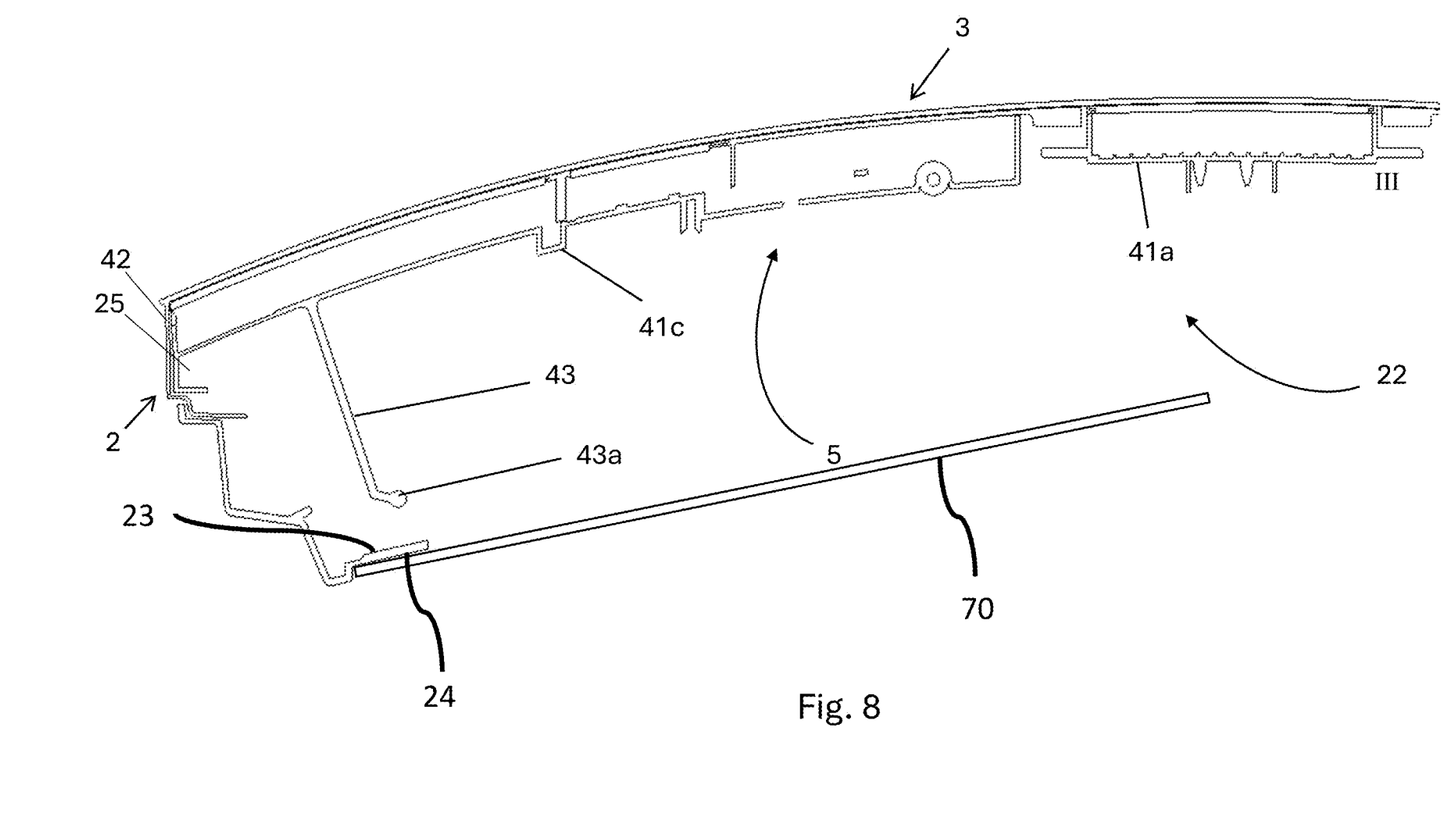
FIG. 8 is a schematic view showing the plate in its final assembled position within the tailgate, according to an embodiment.

In the assembled position, the side end 42 of the supporting plate 4 is located in an area in which it is adjacent to a side wall of the tailgate 1 (as can be seen in FIGS. 1, 7 and 8), which makes it possible to extend the lighting signature of the lighting strip 63 and/or the illumination of the signal lights 62 with corresponding items of equipment borne by the side walls of the vehicle. Thus, it is possible to reduce the effect of a break in the lighting between the lighting devices of the tailgate 1 and those of the side walls of the vehicle. The area in which the side end 42 is located is not accessible to the operator who mounts the plate on the tailgate. Blind assembly of the supporting plate 4 is therefore carried out by the operator. In the case in which the supporting plate 4 extends across almost the entire width of the tailgate 1, its two side ends 42 are each in an area in which they are adjacent to a side wall of the tailgate 1. Consequently, in this case, the operator has to carry out two blind assemblies through the second opening 22. In other words, the operator mounts a first portion of the mounting plate 4 on the tailgate 1 (as illustrated in FIGS. 4 to 6B), which portion includes the portions 41a and 41c which have already been preassembled together outside the tailgate 1, and then mounts a second portion (portion 41b) of the supporting plate 4 on the tailgate 1. Of course, the portions 41a and 41c can be mounted independently of one another on the tailgate, and then be connected to one another. The operator then connects the portions 41a and 41b to form the supporting plate 4. Finally, each of the side portions 41b and 41c is equipped with a mounting arm 43 that projects from the main body of the supporting plate 4. This mounting arm 43 includes a pivot member 43a that has an axis of rotation located at the end of the mounting arm 43. The pivot member 43a, formed by lugs 9 connected to one another by a cylindrical rod and molded as one piece with the mounting arm 43, allows assembly by insertion of the guide means into the guide grooves, and then pivoting of the supporting plate 4 about the axis of rotation of the pivot member 43a when the mounting arm 43 reaches the end of travel within the guide grooves.

In order to allow such blind assembly of the supporting plate 4 in a straightforward and repeatable manner, the tailgate 1 according to the various disclosed embodiments is therefore provided with guide means (8, 9, 43a) that are configured to guide the supporting plate 4 (or the portion in question of the supporting plate 4) between an insertion position I and the assembled position III. A portion of these guide means 8 is, in the embodiment shown, formed as one piece with the outer surface of the inner panel 2. Of course, these guide means (or only a portion of these guide means) could be added to the outer surface of the inner panel 2. These guide means (particularly visible in FIGS. 6A and 6B) include two ribs 8 (only one of which is visible) delimiting two guide grooves (only the lower guide groove is visible in the figures) within which the pivot member 43a of the mounting arm 43 can be inserted and guided in a translational movement. The pivot member 43a, including the two lugs 9 connected to one another by a cylindrical rod, has an axis of rotation about which the mounting arm 43 of the supporting plate 4 can pivot when it reaches the end of travel in the guide grooves until the supporting plate 4 reaches the assembled position III. In one embodiment not shown, the pivot member is not necessary located at the end of the mounting arm. In such a case, the shape of the guide grooves is adapted accordingly to allow the mounting plate to pivot about the axis of rotation of the pivot member.

In order to facilitate the insertion of the lugs 9 and the guidance of the mounting arm 43 of the plate within the guide grooves, these grooves can be in the shape of a flared "U" which facilitates first the entry of the lugs 9 and then guides them within their narrowing cross section up to the bottom of the guide grooves where the mounting arm 43 reaches the desired position in order to pivot the supporting plate 4.

According to one embodiment not shown, the tailgate includes a trim element 70 that is intended to cover the second opening so that this opening is not visible from the passenger compartment of the vehicle. Such a trim element 70 can be removably attached to the inner surface of the inner panel 24 so that it can be disassembled if maintenance is needed on the supporting plate or on one of the items of equipment that it bears.

The mounting of the supporting plate 4 within the dry zone 5 of the tailgate 1, delimited between the outer surface 23 of the inner panel 2 and the inner surface 31 of the outer skin 3, is carried out as follows and is described with reference to FIGS. 4 to 8.

Figure 4:
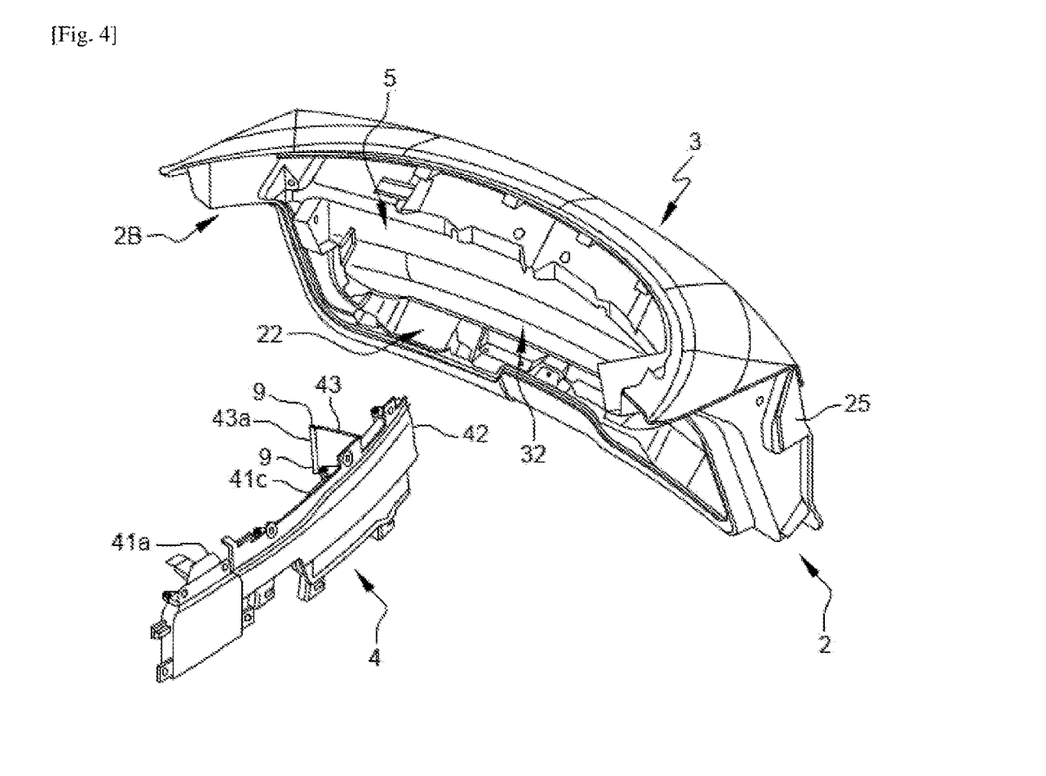
FIG. 4 is a perspective view showing the start of the process of mounting a portion of the supporting plate within the tailgate, according to an embodiment.

The operator positions the first portion (41a, 41c) of the supporting plate 4 to be assembled in front of the second opening 22 in the inner panel 2 (FIG. 4).

Figure 5:
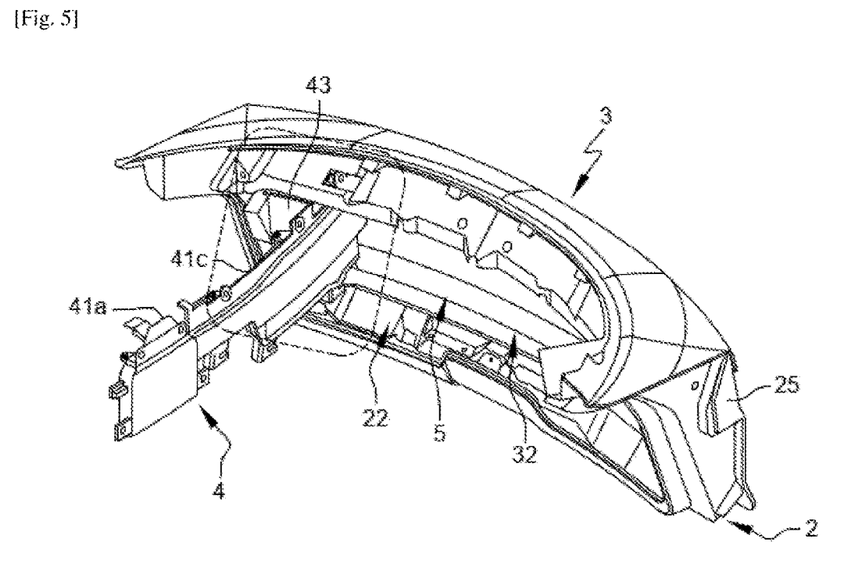
FIG. 5 is a perspective view showing the supporting plate in its insertion position, according to an embodiment.
Figure 6A:
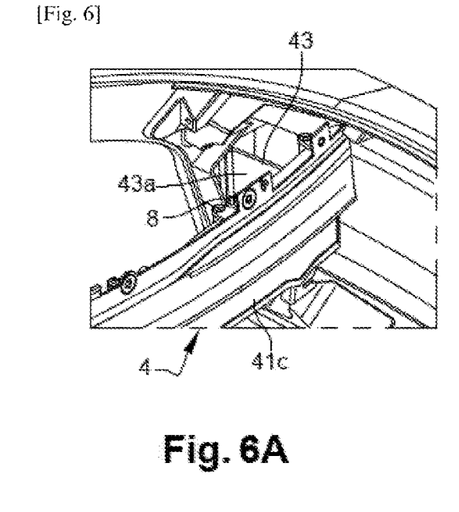
Figure 6B:
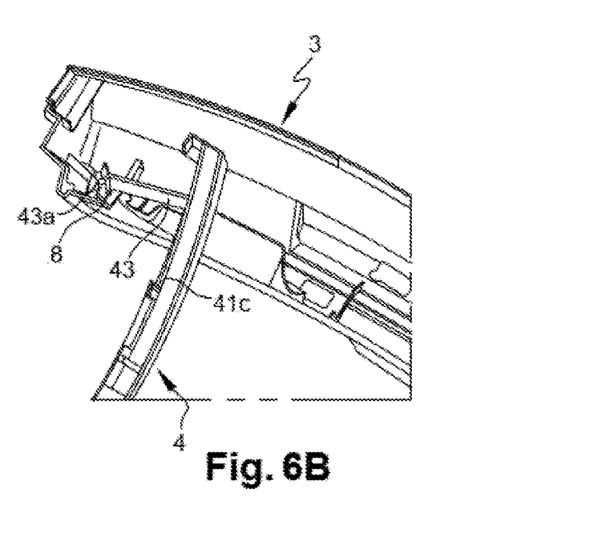

Said portion (41a, 41c) of the supporting plate 4 is inserted into the second opening 22 in order to be positioned in an position of insertion of the supporting plate 4 in which the supporting plate 4 extends in a direction that is substantially perpendicular to the general plane (not shown) formed by the second opening 22 (FIG. 5 and FIG. 7). When the supporting plate 4 is in this insertion position I, the lugs 9 of the pivot member 43a of the mounting arm 43 can be easily inserted into the guide grooves formed by the ribs 8.

The end of the guide arm 43 is then guided within the guide grooves until reaching the end of travel. The mounting plate is therefore successively in an intermediate pivot start position IIa in which it begins its rotation about the axis of rotation of the pivot member 43a, and then in a pivot position IIb in which the side end 42 slots into the housing 25.

Next, the supporting plate is brought into its final assembled position III in which the side end 42 of the portion (41a, 41c) of the supporting plate 4 is accommodated within a housing 25 of corresponding shape defined in the inner panel 2. Such a housing allows the supporting plate 4 to be secured in position and prevents the supporting plate 4 from moving when the vehicle moves.

The same mounting process is carried out for the second portion 41b of the supporting plate 4, on the opposite side of the tailgate 1.

Finally, the portions 41a and 41b of the two portions of the supporting plate 4 are connected to one another in order to form the supporting plate 4.

The various disclosed embodiments are not limited to the embodiments presented, and other embodiments will become clearly apparent to those skilled in the art.

What is claimed is:

1. A motor vehicle opening panel comprising:
an inner panel provided with an upper portion in which a first opening intended to accommodate a window is formed and a lower portion in which a second opening is formed; and
an outer skin, at least partially made of plastic material, mounted on the inner panel, comprising an inner surface facing an outer surface of the inner panel; and
a supporting plate adapted to support equipment items, wherein the supporting plate is joined to the inner panel and covered by the outer skin, the supporting plate being accessible through the second opening, wherein the supporting plate is adapted to be within a space defined by the outer surface of the inner panel and the inner surface of the outer skin, wherein the supporting plate further comprises:
- guide means, wherein the guide means are adapted to guide a blind assembly of the supporting plate between the outer surface of the inner panel and the inner surface of the outer skin through the second opening of the inner panel; and
- two side edges at on opposite ends of the supporting plate, wherein the two side edges are accommodated within respective housings of the inner panel and within the space defined by the inner panel and the outer skin;

wherein the supporting plate is made of several portions joined to one another, wherein the several portions include a first side portion and a second side portion.

2. The motor vehicle opening panel according to claim 1, wherein the guide means allow the supporting plate to be mounted between the outer surface of the inner panel and the inner surface of the outer skin such that a side edge of the two side edges of the supporting plate is adjacent to a side wall of the opening panel.

3. The motor vehicle opening panel according to claim 1, wherein the guide means are configured such that the supporting plate is guided between an initial position of insertion of the supporting plate in which the supporting plate extends in a direction that is not parallel to a general plane formed by the second opening and a final assembled position of the supporting plate in which the supporting plate extends in a direction that is substantially parallel to said general plane formed by the second opening.

4. The motor vehicle opening panel according to claim 1, wherein at least a portion of the guide means is formed as one piece with the inner panel and is configured to accommodate a mounting arm of the supporting plate.

5. The motor vehicle opening panel according to claim 3, wherein the guide means comprise at least two ribs each forming a guide groove, the guide means further comprising at least two lugs, wherein the two lugs are formed as one piece with a mounting arm of the supporting plate, molded as one piece therewith, and forming a pivot member that has an axis of rotation about which the mounting arm of the supporting plate pivot until the mounting arm reaches the final assembled position.

6. The motor vehicle opening panel according to claim 5, wherein the supporting plate comprises a main body from which projects the mounting arm with which the lugs are formed as one piece, said lugs being configured so as to be inserted into the guide grooves and pivot about the axis of rotation of the pivot member when the mounting arm reaches an end of travel within the guide grooves.

7. The motor vehicle opening panel according to claim 1, further comprising a trim element attached to an inner surface of the inner panel and covering the second opening, by riveting, screwing, or snap-fitting.

8. The motor vehicle opening panel according to claim 1, wherein the supporting plate comprises an electromagnetic radiation emitting and/or receiving device, wherein the electromagnetic radiation emitting and/or receiving device emits and/or receives an electromagnetic radiation, and wherein the outer skin comprises, facing the electromagnetic radiation emitting and/or receiving device, at least one transmission zone, made of a plastic material, which is at least partially transparent to said electromagnetic radiation.

9. The motor vehicle opening panel according to claim 1, comprising a tailgate or a side door.

10. The motor vehicle opening panel according to claim 3, wherein the supporting plate extends in the direction that is substantially perpendicular to the general plane formed by the second opening during the initial position of insertion of the supporting plate.

11. The motor vehicle opening panel according to claim 5, wherein the at least two lugs are connected by a cylindrical rod.

12. The motor vehicle opening panel according to claim 7, wherein the trim element attached to the inner surface of the inner panel is attached in a removable manner.

13. The motor vehicle opening panel according to claim 1, wherein one of the two side edges is at a side end of the first side portion and another of the two side edges is at a side end of the second side portion.

14. The motor vehicle opening panel according to claim 4, wherein the at least a portion of the guide means is molded as the one piece with the inner panel.

15. The motor vehicle opening panel according to claim 1, wherein the inner panel is made of a plastic material.

16. The motor vehicle opening panel according to claim 1, further comprising:
- lighting devices that are mounted on the two side edges of the supporting plate.

17. The motor vehicle opening panel according to claim 1, wherein the two side edges are on different perimetric edges of the supporting plate.

18. A motor vehicle opening panel comprising:
- an inner panel provided with an upper portion in which a first opening intended to accommodate a window is formed and a lower portion in which a second opening is formed; and
- an outer skin, at least partially made of plastic material, mounted on the inner panel, comprising an inner surface facing an outer surface of the inner panel; and
- a supporting plate adapted to support equipment items, wherein the supporting plate is joined to the inner panel and covered by the outer skin, the supporting plate being accessible through the second opening, wherein the supporting plate further comprises:
  - guide means, wherein the guide means are adapted to guide a blind assembly of the supporting plate between the outer surface of the inner panel and the inner surface of the outer skin through the second opening of the inner panel;
  - two side edges at opposite ends of the supporting plate, wherein the two side edges are accommodated within respective housings of the inner panel and within a space formed by the inner panel and the outer skin; and
  - a mounting arm that projects from a main body of the supporting plate, wherein the mounting arm has a pivot member that pivots the supporting plate about an axis of rotation of the pivot member, wherein the main body of the supporting plate is at a final assembled position and secured within the respective housings after the pivot;

wherein the supporting plate is made of several portions joined to one another, wherein the several portions include a first side portion and a second side portion.

* * * * *